United States Patent
Haupt et al.

(10) Patent No.: US 7,933,455 B2
(45) Date of Patent: *Apr. 26, 2011

(54) GROUPING ITEMS IN VIDEO STREAM IMAGES INTO EVENTS

(75) Inventors: Gordon T. Haupt, San Francisco, CA (US); J. Andrew Freeman, San Jose, CA (US); Stephen D. Fleischer, San Francisco, CA (US); Robert P. Vallone, Palo Alto, CA (US); Stephen G. Russell, San Francisco, CA (US); Timothy B. Frederick, San Francisco, CA (US)

(73) Assignee: 3VR Security, Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/632,726

(22) Filed: Dec. 7, 2009

(65) Prior Publication Data

US 2010/0080492 A1  Apr. 1, 2010

Related U.S. Application Data

(62) Division of application No. 11/398,158, filed on Apr. 4, 2006, now Pat. No. 7,646,895.

(60) Provisional application No. 60/668,644, filed on Apr. 5, 2005.

(51) Int. Cl.
*G06K 9/62* (2006.01)
*G06K 9/00* (2006.01)

(52) U.S. Cl. ........ 382/224; 382/103; 382/115; 382/305; 348/159

(58) Field of Classification Search .................. None
See application file for complete search history.

(56) References Cited

U.S. PATENT DOCUMENTS 5,969,755 A * 10/1999 Courtney ............... 348/143
(Continued)

FOREIGN PATENT DOCUMENTS

WO  WO 03/047258 A1  6/2003

OTHER PUBLICATIONS

Javed et al., "Tracking across multiple cameras with disjoint views," Proc. $9^{th}$ IEEE Int'l Conf. On Computer Vision, vol. 2 (Oct. 2003) pp. 952-957.

"Written Opinion of the International Preliminary Examining Authority" received in related International application No. PCT/US2005/008655 (8 pages).

(Continued)

*Primary Examiner* — Bhavesh M Mehta
*Assistant Examiner* — Barry Drennan
(74) *Attorney, Agent, or Firm* — Hickman Palermo Truong & Becker LLP; Daniel D. Ledesma

(57) ABSTRACT

A technique is disclosed for determining when to close a group of a plurality of groups. A closed group is one to which an image set may not be added. Each group includes one or more image sets. Each image set includes one or more images of at least one object. Each group corresponds to an object that is common among images in the one or more image sets that belong to the group. Determining when to close a particular group is based, at least in part, on one or more factors, such as how many image sets are in the particular group, the length of time the particular group has been open, and data about the one or more image sets in the particular group.

16 Claims, 2 Drawing Sheets

U.S. PATENT DOCUMENTS

| | | | |
|---|---|---|---|
| 6,188,381 | B1 | 2/2001 | Van der Wal et al. |
| 6,466,275 | B1 * | 10/2002 | Honey et al. .......... 348/722 |
| 6,754,389 | B1 | 6/2004 | Dimitrova et al. |
| 6,999,613 | B2 | 2/2006 | Colmenarez et al. |
| 7,068,723 | B2 | 6/2006 | Foote et al. |
| 7,298,895 | B2 | 11/2007 | Loui et al. |
| 7,450,735 | B1 | 11/2008 | Shah et al. |
| 2002/0196327 | A1 | 12/2002 | Rui et al. |
| 2003/0086496 | A1 | 5/2003 | Zhang et al. |
| 2006/0066722 | A1 | 3/2006 | Yin et al. |

OTHER PUBLICATIONS

Pending claims of related International application No. PCT/US2005/008655 (10 pages).

"Notification of Transmittal of the International Preliminary Report on Patentability" received in International application No. PCT/US2005/008655 (7 pages).

Current claims of PCT/US2005/008655 (10 pages).

"Notification of Transmittal of the International Preliminary Report on Patentability" received in International application No. PCT/US2005/008735 (16 pages).

Current claims of PCT/US2005/008735 (7 pages).

* cited by examiner

GROUPING ITEMS IN VIDEO STREAM IMAGES INTO EVENTS

CLAIM OF PRIORITY

This application is a divisional of U.S. patent application Ser. No. 11/398,158, filed Apr. 4, 2006 now U.S. Pat. No. 1,646,895, entitled GROUPING ITEMS IN VIDEO STREAM IMAGES INTO EVENTS, which is incorporated herein by reference as if fully set forth herein, under 35 U.S.C. §120; which claims domestic priority under 35 U.S.C. 119(e) to U.S. Provisional Patent Application No. 60/668,644, filed Apr. 5, 2005, entitled METHOD AND APPARATUS FOR GROUPING ITEMS IN VIDEO STREAM IMAGES INTO EVENTS, the contents of which are hereby incorporated by reference in their entirety for all purposes.

RELATED APPLICATIONS

This application is related to U.S. Provisional Patent Application No. 60/554,050, filed on Mar. 16, 2004, entitled VIDEO INTELLIGENCE PLATFORM; U.S. patent application Ser. No. 10/965,687, filed on Oct. 13, 2004, entitled PIPELINE ARCHITECTURE FOR ANALYZING MULTIPLE VIDEO STREAMS; U.S. patent application Ser. No. 11/081,753, filed Mar. 15, 2005, entitled INTERACTIVE SYSTEM FOR RECOGNITION ANALYSIS OF MULTIPLE STREAMS OF VIDEO; and U.S. patent application Ser. No. 11/082,026, filed Mar. 15, 2005, entitled INTELLIGENT EVENT DETERMINATION AND NOTIFICATION IN A SURVEILLANCE SYSTEM. The contents of each related application are herein incorporated by reference in their entirety for all purposes.

FIELD OF THE INVENTION

The present invention relates to video surveillance systems, and more specifically, to a system that intelligently groups images of items in video streams into events.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

"Biometrics" refers to unique physiological and/or behavioral characteristics of a person that can be measured or identified. Example characteristics include height, weight, shape, fingerprints, retina patterns, skin and hair color, and voice patterns. Identification systems that use biometrics are becoming increasingly important security tools. Identification systems that recognize irises, voices or fingerprints have been developed and are in use. These systems provide highly reliable identification, but require special equipment to read the intended biometric (e.g., fingerprint pad, eye scanner, etc.) Because of the expense of providing special equipment for gathering these types of biometric data, facial recognition systems requiring only a simple video camera for capturing an image of a face have also been developed.

In terms of equipment costs and user-friendliness, facial recognition systems provide many advantages that other biometric identification systems cannot. For example, face recognition does not require direct contact with a user and is achievable from relatively far distances, unlike most other types of biometric techniques, e.g., fingerprint and retina pattern. In addition, face recognition may be combined with other image identification methods that use the same input images. For example, height and weight estimation based on comparison to known reference objects within the visual field may use the same image as face recognition, thereby providing more identification data without any extra equipment.

However, facial recognition systems can have large error rates. In order to provide the most reliable and accurate results, current facial recognition systems typically require a person who is to be identified to stand in a certain position with a consistent facial expression, facing a particular direction, in front of a known background and under optimal lighting conditions. Only by eliminating variations in the environment is it possible for facial recognition systems to reliably identify a person. Without these types of constraints in place, the accuracy rate of a facial recognition system is poor, and therefore facial recognition systems in use today are dedicated systems that are only used for recognition purposes under strictly controlled conditions.

Video surveillance is a common security technology that has been used for many years, and the equipment (i.e., video camera) used to set up a video surveillance system is inexpensive and widely available. A video surveillance system operates in a naturalistic environment, however, where conditions are always changing and variable. A surveillance system may use multiple cameras in a variety of locations, each camera fixed at a different angle, focusing on variable backgrounds and operating under different lighting conditions. Therefore, images from surveillance systems may have various side-view and/or top-view angles taken in many widely varying lighting conditions. Additionally, the expression of the human face varies constantly. Comparing facial images captured at an off-angle and in poor lighting with facial images taken at a direct angle in well lit conditions (i.e., typical images in a reference database) results in a high recognition error rate.

In a controlled environment, such as an entry vestibule with a dedicated facial recognition security camera, the comparison of a target face to a library of authorized faces is a relatively straightforward process. An image of each of the authorized individuals will have been collected using an appropriate pose in a well lighted area. The person requesting entry to the secured facility will be instructed to stand at a certain point relative to the camera, to most closely match the environment in which the images of the authorized people were collected.

For video surveillance systems, however, requiring the target individual to pose is an unrealistic restriction. Most security systems are designed to be unobtrusive, so as not to impede the normal course of business or travel, and would quickly become unusable if each person traveling through an area were required to stop and pose. Furthermore, video surveillance systems frequently use multiple cameras to cover multiple areas and especially multiple entry points to a secure area. Thus, the target image may be obtained under various conditions, and will generally not correspond directly to the pose and orientation of the images in a library of images.

When capturing multiple images of individuals and other "objects," it is important to group the image sets of a single object with each other. A group of one or more image sets of a particular object is referred to as an "event." The image sets of an event are used to compare the event with other events in the surveillance system. Before such comparisons are made, one or more images sets of a particular object are captured and must be grouped together to form a single event.

For example, when an individual walks past a security checkpoint, a camera may capture multiple images (e.g. video) of the individual. It is desirable to group all images of the individual at that time in a single event. Also, a second camera at the security checkpoint may capture multiple images of the same individual but from a different angle. It may also be desirable to group all images from the second camera with the images from the first camera.

Determining a group in which to add a new image set and determining when to close a group (i.e. become an event) is difficult given the various conditions in which multiple images are obtained and the possibility of multiple cameras capturing multiple images of the same object.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS OF THE INVENTION

Figure 1:
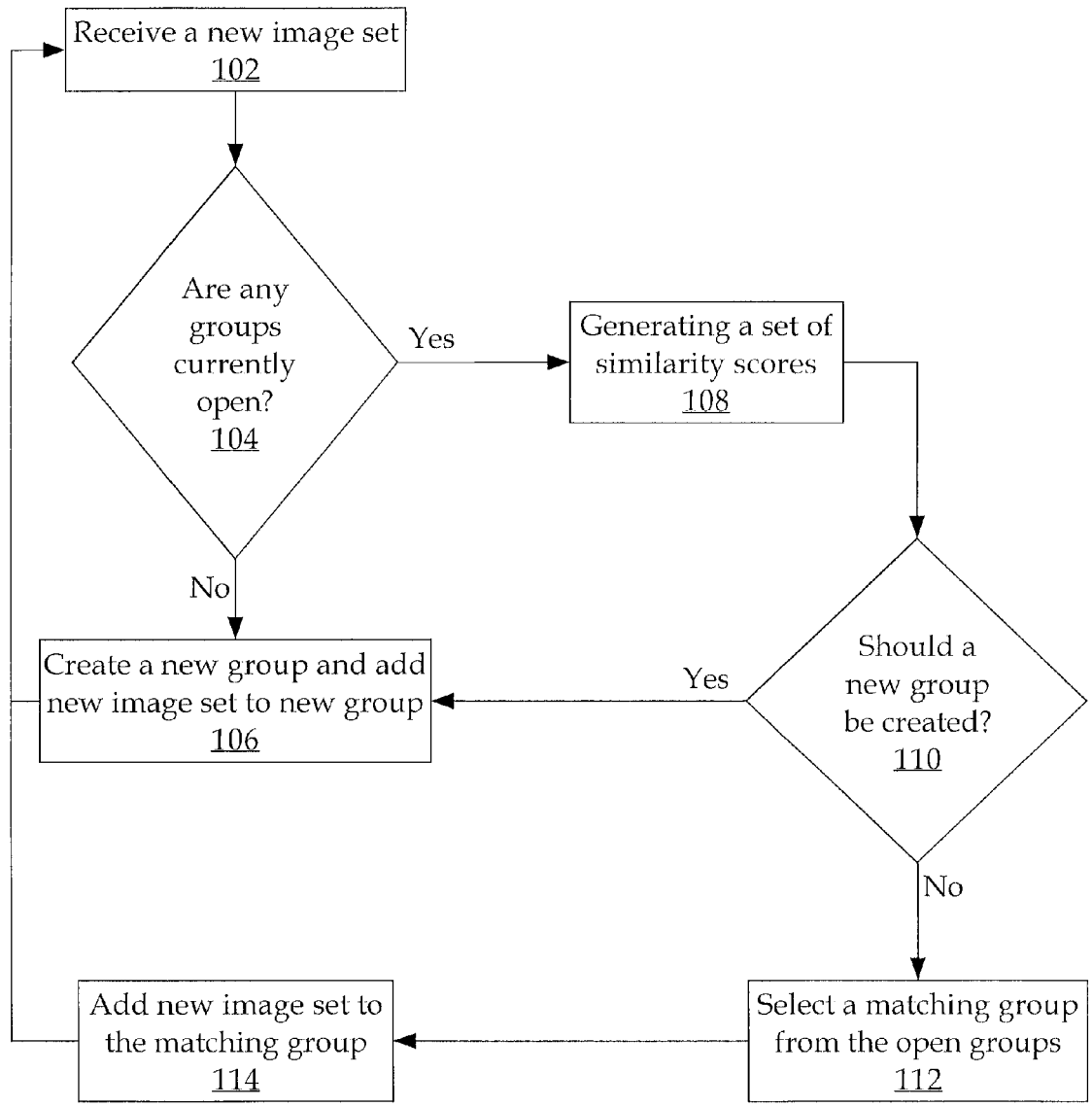
FIG. 1 is a flow diagram that illustrates a way to process a new image set, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

OVERVIEW

A technique for determining a group in which to add a new image set, obtained from a video surveillance system, is disclosed. In one embodiment, when a new image set is obtained, similarity scores are generated between the new image set and one or more image sets of each of the already-established groups. The similarity scores are used to determine to which group to add the new image set. There are a variety of ways in which the similarity scores may be used to select the appropriate group. For example, the selected group may be:

the group that has an image set with the highest weighted similarity score relative to the new image set, the group associated with the highest average similarity score, or the group with the highest number of image sets that have corresponding similarity scores above a certain threshold.

Techniques are disclosed for determining when to close a group. Once a group is closed, new image sets are not added to the group. The determination to close a group may be made based on one or more of the following: when the last image set was added to a group, how many image sets are in a group, how long a group has been open, and data about one or more image sets in the group.

DEFINITIONS

The following are definitions of terms that are used throughout the application:

An "image set" is a set of one or more images, each of which depict the same object.

A "group" is a set of one or more image sets. A closed group is a group to which new image sets may not be added. An open group is one in which new image sets may be added. A group may have a limit on the number of image sets it may include. However, even though the number of image sets of an open group has reached the limit, it does not necessarily mean that the open group must be closed. The open group may still include new image sets but it must drop an image set either each time a new image set is added, or when the group is to be closed, so as to not exceed the limit placed on the number of image sets in the group. Determining which image sets from a group to drop may be based on multiple factors, such as the similarity score between the image sets, suggesting that similarity scores indicating a near perfect match between two image sets may be substantial duplicates of each other. Other factors may include information external to the image set, such as when the image set was obtained and where the camera that captured the image set is located.

An "event" includes one or more related image sets. An event optionally includes other information, such as the date and time the image set(s) were captured, the identity of the camera(s) that captured the image set(s), and the physical location(s) of the camera(s). In one embodiment, a closed group is treated as an event.

A "feature set" is a set of identifying information (such as height, color, shape, facial characteristics, etc.) extracted from one or more image sets of an event. As shall be described in greater detail hereafter, feature sets may be used to compare events with other events.

The result of the comparison between feature sets is called a "similarity score". Using similarity scores, a target object may be compared with one or more other objects (e.g. faces of known criminals or license plates of stolen cars) stored in a surveillance system to determine whether the target object matches the one or more other objects.

Implementing Groups

A group may be implemented in various ways. For example, a group may be implemented as a linked list of image sets. As another example, a group may be implemented as an object with references to one or more image sets. Alternatively, a group may be implemented by setting a variable associated with the new image set to indicate the group to which the new image set belongs. Or, a group may be implemented by allocating separate areas of memory, wherein image sets of a certain group may be stored. There are multiple ways to create a group and indicate to which group a new image set belongs. Embodiments of the invention are not limited to any particular way of implementing groups.

Processing a New Image Set

When a new image set is captured by a camera in a video surveillance system, the new image set may be put into a new group, put into an existing group, or discarded. When the new image is put into an existing group, the existing group that is selected to include the new image set is referred to herein as the "matching group".

There are various reasons why a new image set may be discarded. For example, a new image set may be discarded when the new image set is substantially the same as another image set in a group. As another example, a new image set may be discarded due to hardware constraints that do not permit the surveillance system to add additional image sets.

FIG. 1 is a flow diagram that illustrates a way to process a new image set, according to an embodiment of the invention.

At step 102, a new image set is received. For example, the new image set may be obtained from a video camera at an airport, or from a camera in a hotel lobby. The new image set may be received, for example, as a pipeline object at stage 3 in a pipeline architecture, such as the pipeline architecture described in U.S. patent application Ser. No. 10/965,687, filed on Oct. 13, 2004, entitled PIPELINE ARCHITECTURE FOR ANALYZING MULTIPLE VIDEO STREAMS. Stages 1 and 2 of the pipeline architecture correspond to obtaining images and analyzing the obtained images to determine whether the obtained images are of interest (e.g. depicts a person's face).

At step 104, it is determined whether any groups are currently open. Initially, no groups will be open. Consequently, a new group will be created (step 106) and the new image set will be added to the new group.

When at least one group is open, a set of one or more similarity scores are generated between the new image set and one or more image sets of one or more open groups (step 108).

An initial determination may be made as to whether a new group should be created (step 110). For example, it may be determined, based on similarity score, that instead of adding the new image set to any open groups, a new group should be created, and that the new image set should be added to the new group (step 106).

For example, if the similarity score of each of the one or more image sets in the open groups is below a certain threshold score, then a new group is created and the new image set is added to that new group.

Selecting a matching group from the currently open groups (step 112) includes selecting a matching group based on the generated set of similarity scores and one or more criteria. The new image set is then added to the selected matching group (step 114).

After the new image set is added to a new group (step 106), or to a matching group (step 114), the process may proceed back to step 102 where another new image set is received.

As an example of the process illustrated in FIG. 1, consider the following. Suppose groups A, B, and C are open at the time a new image set N is received. When N arrives (step 102) and it is determined that at least one group is open (step 104), a feature set is generated for N, and compared against the feature sets of each of the image sets in groups A, B, and C (step 108). Each such comparison results in a similarity score. For the purpose of illustration, suppose that 1) group A includes image sets whose similarity scores relative to N are 0.7, 0.8, and 0.85, 2) group B includes image sets with similarity scores relative to N are 0.5, 0.7, and 0.75, and 3) group C includes image sets with similarity scores relative to N are 0.6 and 0.9.

At step 110, suppose a threshold for determining whether N should be added to any of the open groups (i.e. whether a new group should be created) is greater than 0.75. Because groups A and C include images sets whose similarity score relative to N are greater than the threshold, the process proceeds to step 112 where a matching group is selected from the currently available open groups.

According to one embodiment, any open groups that do not have image sets with similarity scores relative to N above the threshold used in step 110 are not considered in step 112 (i.e. when selecting a matching group from the open groups). Therefore, according to the example given above, group B would not be considered as a possible matching group in step 112.

Weighted Similarity Scores

According to one embodiment, similarity scores may be modified based on external information. The resulting modified similarity scores are referred to herein as weighted similarity scores.

In this context, "external information" refers to any information not derived from the image set itself. For example, similarity scores may be weighted based on time (e.g. how long an image set has been stored, the date and time of the image set, etc.) and space (e.g. the particular camera that captured the image set, physical location of the camera that captured the image set, etc.). Various techniques for generating weighted similarity scores based on external information are described in U.S. patent application Ser. No. 11/081,753, filed Mar. 15, 2005, entitled INTERACTIVE SYSTEM FOR RECOGNITION ANALYSIS OF MULTIPLE STREAMS OF VIDEO.

As an example of generating weighted similarity scores, assume that two image sets have, relative to each other, a similarity score of 0.8 (where, e.g. 1.0 indicates a perfect match and 0.0 indicates no possibility of a match) but the image sets were captured within a few minutes of each other in locations separated by hundreds of miles. Under these circumstances, the similarity score between the two images sets may be reduced, such as a resulting weighted similarity score of 0.1 or 0.0.

As another example, if two image sets, relative to each other, have a similarity score of 0.7 and the image sets were captured within a few seconds of each other and were captured by the same camera or were captured by different cameras in the same hallway, then the similarity score may be weighted positively, such as a resulting similarity score of 0.9.

Selecting a Matching Group

According to one embodiment, a matching group is selected (i.e. in step 112) based, at least in part, on one or more of the following factors:

1) the highest weighted similarity among all image sets in each group;
2) the average similarity scores among at least a subset of the image sets in each group; and
3) the number of image sets, within each group, that have similarity scores above a certain threshold.

The most straightforward way to select a matching group is to select the group with the image set whose similarity score relative to the target event is the highest among all image sets in open groups. But, based on the factors above, there are a number of ways in which a matching group may be selected.

Returning to the example (i.e. with respect to groups A, B, and C) discussed above, suppose group B is considered as a possible matching group in step 112. If the matching group is selected based solely on the second factor above (i.e. highest average similarity score), then group A is selected as the matching group for the new image set, because the average similarity score of groups A, B, and C are 0.78, 0.65, and 0.75, respectively. If the similarity scores were weighted by external information before they were averaged, the result may be different depending on the weighting factors of the external information.

If the matching group is selected based solely on the third factor (i.e. highest number of similarity scores above a certain threshold) and the certain threshold is 0.83, then groups A and C would both be eligible for including the new image set in their respective group. In a situation where such a "tie" occurs, multiple tie breaking rules may be applied. For example, a tie breaking rule may state that the group with the highest similarity score may be selected as the matching group for the new image set. As another example of a tie breaking rule, the group that satisfies one or more of the other factors may be selected as the matching group for the new image set.

At step 112, the selection of a matching group may also be based on any combination of the above-cited factors. For example, each of the groups may be ranked based on each of the three factors above (and perhaps other factors). The group that has the highest score for the most individual factors may be selected as the matching group. For example, suppose group B has the best score for the first factor, and group A has the best score for the second and third factors. Because group A has the best score for the greatest number of factors, group A is selected as the matching group.

According to one embodiment, the average similarity score for a group is calculated by generating a similarity score for each image set in the group, sum the similarity scores together, and divide the sum by the number of image sets in the group. Another way is to sum only the top two or three similarity scores in the group and divide by two or three. According to another embodiment, the average similarity score for a group is calculated by summing the similarity scores of a sample (e.g. a random sample) of image sets in the group and divide by the number of samples. Any technique for averaging two or more image sets of a group may be used to generate an average similarity score.

Closing a Group

After a period of time, it may become desirable to close a group. For example, assume that a particular group includes image sets of a particular person's face. As long as new image sets of that face are being captured, the group should remain open for the new image sets to be added to the group. Eventually, image sets of that face will stop arriving (e.g. that particular person may leave the surveillance zone.) The more time that passes since the image sets of the face stop arriving, the less likely that new image sets for that face will arrive. When it is unlikely that new image sets for a group will arrive, the group should be closed. Once the group is closed, the event represented by the group can be passed on for further processing. Once an event has been passed on to a downstream component, the resources that were being used by the group can be reused for new groups.

In unobtrusive video surveillance systems where the flow of individuals and other objects is constant, the object corresponding to the particular open group may not remain in view of a particular camera or set of cameras for a significant period of time. Therefore, the particular group is eventually closed, meaning that no new image set may be added to the group. The closed group then becomes a new "event" that may be compared against other events in the surveillance system (e.g. by generating similarity scores between the new event and the other events). However, in one embodiment, a group does not have to be closed in order to generate similarity scores between image sets in the group and image sets of stored events. Thus, image sets in open groups may be compared to closed groups (i.e. events).

Many factors may be considered (either individually or in combination) when determining whether to close a particular group. The factors that such a determination may be based on include: 1) how much time has past since the latest image set was added to the particular group, 2) the number of image sets in the particular group, 3) how much time has passed since the particular group was opened, and 4) data about one or more image sets in the particular group.

The first factor may indicate that, because a new image set has not been added to a particular group in awhile (e.g. 10 seconds), it is likely that the object (e.g. person) has moved on to a different location, outside the range of one or more cameras in the surveillance system.

The second factor may indicate that enough image sets have been obtained pertaining to a single object and that additional image sets may only be duplicative in nature to what is already obtained. Because images and video require significant amounts of storage space and CPU cycles in any surveillance system, the second factor may be a commonly used factor due to these hardware constraints.

The third factor may indicate that, due to the constant movement of people and other objects through a surveillance system, it is highly unlikely that an object will remain in view of a camera or set of cameras. Creating two events (i.e. two closed groups) for an individual in a relatively short amount of time may be important information in itself. Also, the third factor may be due to the fact that it would be nearly impossible to keep groups open indefinitely. If groups were never closed, then new image sets would be compared to image sets in an ever-growing number of open groups. Doing so would require vast amounts of memory and processing power.

Pertaining to the fourth factor, data about one or more image sets in a group may include similarity scores, quality measurements, and/or other parameters of one or more image sets in the group. For example, if the overall range of similarity scores in a group becomes too dissimilar, the group may be closed and/or divided into multiple groups. Quality measurements of an image set in a group may include, but are not limited to, the "noisiness" of the image set. "Noise" may be electronic noise or physical noise, such as rain or fog.

Other parameters of an image set that affect the determination whether to close a group may include motion. For example, a camera in a video surveillance system may be configured to track objects only in a certain field of view of the camera. Once an object is outside the certain field of view, the object will no longer be tracked (e.g. additional events based on the object will not be generated). Another parameter may be positive identification. For example, in a license plate recognition system, the video surveillance system may determine that a license plate matches a particular license plate that is being tracked to an extremely high degree of probability, which may be considered a positive identification. Once a positive identification is made, more images of the license plate are no longer helpful. Thus, additional events based on the license plate may not be generated.

In parallel processing systems, the process of determining whether to close one or more groups may be performed concurrently and independently of the process of selecting a matching group. For instance, while new image sets have been captured by the surveillance system, the system may continuously evaluate whether to close any of the groups that are currently open in order to make them "events" that may be stored indefinitely and used to compare against other events.

Hardware Overview

Figure 2:
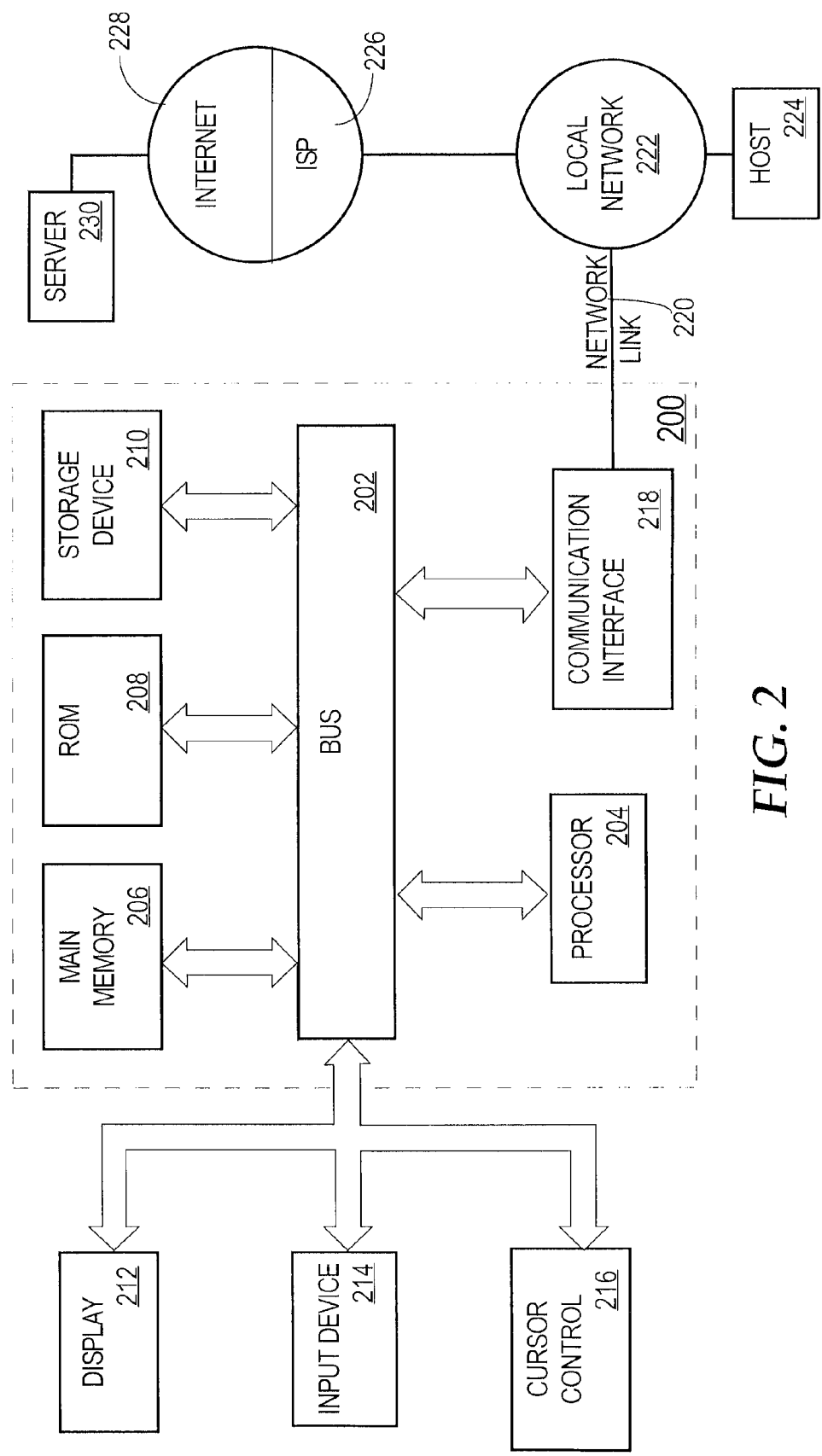
FIG. 2 is a block diagram that illustrates a computer system upon which an embodiment of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM)

or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed:

1. A method of determining whether to close a group, the method comprising:
  establishing a plurality of groups;
  wherein each group of the plurality of groups is associated with an object and includes one or more image sets that have been determined to include the object that is associated with the group;
  wherein each image set comprises one or more images of at least one object;
  determining when to close a particular group of the plurality of groups based, at least in part, on one or more of:
    how many image sets are in the particular group;
    a total amount of time the particular group has been open;
    a dissimilarity between a plurality of similarity scores associated with image sets that are already in the particular group;
    quality measurements that are indicated in data that is stored in association with at least one image set in the particular group;
    a positive identification, of an object associated with the particular group, based on a similarity score between (a) at least one image set in the particular group and (b) a stored event; or
    an object, associated with the particular group, being in an image but outside a field of view that is associated with a certain portion of the image;
  before said particular group is closed:
    receiving a first new image set, and
    comparing the first new image set to one or more image sets in said particular group and to one or more images sets in one or more other groups of the plurality of groups;
  after the particular group is closed:
    receiving a second new image set, and
    comparing the second new image set to one or more images sets in one or more groups of the plurality of groups without comparing the second new image set to any image set in said particular group;
  wherein the method is performed by one or more processors.

2. The method of claim 1, wherein determining when to close a particular group of the plurality of groups is performed based, at least in part, on how many image sets are in the particular group.

3. The method of claim 1, wherein determining when to close a particular group of the plurality of groups is performed based, at least in part, on a total amount of time the particular group has been open.

4. The method of claim 1, wherein determining when to close a particular group of the plurality of groups is performed based, at least in part, on a dissimilarity between a plurality of similarity scores associated with image sets that are already in the particular group.

5. The method of claim 1, wherein determining when to close a particular group of the plurality of groups is performed based, at least in part, on quality measurements that are indicated in data that is stored in association with at least one image set in the particular group.

6. The method of claim 1, wherein determining when to close a particular group of the plurality of groups is performed based, at least in part, on a positive identification, of an object associated with the particular group, based on a similarity score between (a) at least one image set in the particular group and (b) a stored event.

7. The method of claim 1, wherein determining when to close a particular group of the plurality of groups is performed based, at least in part, on an object, associated with the particular group, being in an image but outside a field of view that is associated with a certain portion of the image.

8. The method of claim 1, the method further comprising, before the particular group is closed:
  receiving a new image set;
  selecting the particular group from the plurality of groups; and
  adding the new image set to the particular group;
  wherein selecting the particular group from the plurality of groups includes:
    generating a similarity score between the new image set and one or more image sets in each group of the plurality of groups; and
    selecting the particular group based, at least in part, on one or more of the following factors:
      a highest weighted similarity score of each group, wherein the highest weighted similarity score of a group of the plurality of groups is weighted based on external information;
      an average similarity score of each group, wherein the average similarity score for said each group is the average of the similarity scores of the plurality of image sets of said each group; or
      the number of image sets in each group that have corresponding similarity scores above a certain threshold.

9. One or more volatile or non-volatile storage media storing instructions which, when executed by one or more processors, cause the performance of the method recited in claim 1.

10. One or more volatile or non-volatile storage media storing instructions which, when executed by one or more processors, cause the performance of the method recited in claim 2.

11. One or more volatile or non-volatile storage media storing instructions which, when executed by one or more processors, cause the performance of the method recited in claim 3.

12. One or more volatile or non-volatile storage media storing instructions which, when executed by one or more processors, cause the performance of the method recited in claim 4.

13. One or more volatile or non-volatile storage media storing instructions which, when executed by one or more processors, cause the performance of the method recited in claim 5.

14. One or more volatile or non-volatile storage media storing instructions which, when executed by one or more processors, cause the performance of the method recited in claim 6.

15. One or more volatile or non-volatile storage media storing instructions which, when executed by one or more processors, cause the performance of the method recited in claim 7.

16. One or more volatile or non-volatile storage media storing instructions which, when executed by one or more processors, cause the performance of the method recited in claim 8.

* * * * *